United States Patent [19]

Schmidt et al.

[11] Patent Number: 4,867,581
[45] Date of Patent: Sep. 19, 1989

[54] BEARING HOUSING, ESPECIALLY FOR A UNILATERALLY AND AXIALLY BRACED EXTERNAL-ROTOR MOTOR

[75] Inventors: Helmut Schmidt, Reichenberg; Peter Hähnel, Wendelstein, both of Fed. Rep. of Germany

[73] Assignee: Siemens Aktiengesellschaft, Munich, Fed. Rep. of Germany

[21] Appl. No.: 906,335

[22] Filed: Sep. 11, 1986

[30] Foreign Application Priority Data

Sep. 23, 1985 [DE] Fed. Rep. of Germany ....... 3533898

[51] Int. Cl.$^4$ ............................................. F16C 43/02
[52] U.S. Cl. ...................................... 384/517; 310/42; 310/67 R; 310/90; 310/DIG. 6; 384/537
[58] Field of Search ...................... 310/90, 67 R, 68 R, 310/68 B, 51, DIG. 6, 42, 254; 384/517, 428, 563, 438, 542, 215, 535, 581, 567, 537, 539

[56] References Cited

U.S. PATENT DOCUMENTS

| | | | |
|---|---|---|---|
| 1,310,756 | 7/1919 | Langhaar | 384/517 |
| 1,332,444 | 3/1920 | Lindman | 384/517 |
| 3,086,473 | 4/1963 | Miloradovitch | 310/90 |
| 3,516,717 | 6/1970 | Peterson | 384/517 |
| 3,934,957 | 1/1976 | Derner | 384/563 |
| 4,115,715 | 9/1978 | Muller | 310/67 R |
| 4,435,673 | 3/1984 | Higano | 318/754 A |
| 4,540,906 | 9/1986 | Blom | 310/67 R |
| 4,602,876 | 7/1986 | Miki | 384/539 |
| 4,629,919 | 12/1986 | Merkle | 310/67 R |
| 4,672,250 | 6/1987 | Seitz | 310/90 |
| 4,724,342 | 2/1988 | Klein et al. | 310/67 R |

FOREIGN PATENT DOCUMENTS

| | | |
|---|---|---|
| 0149228 | 7/1985 | European Pat. Off. . |
| 1675062 | 12/1970 | Fed. Rep. of Germany ...... 384/584 |
| 2718428 | 11/1977 | Fed. Rep. of Germany . |
| 2629427 | 1/1978 | Fed. Rep. of Germany . |
| 2749729 | 5/1979 | Fed. Rep. of Germany . |
| 3101596 | 8/1982 | Fed. Rep. of Germany . |
| 3327123 | 2/1984 | Fed. Rep. of Germany . |
| 2209423 | 6/1974 | France . |
| 2507714 | 12/1982 | France . |
| 1085272 | 9/1967 | United Kingdom ................ 384/537 |

OTHER PUBLICATIONS

"Spring Washers for Axial Adjustment of Ball Bearings of Small Power Motors"; D1N 42013, Jan. 1986, Siemens, Germany, 2 pages.

"Disc Springs; Dimensions and Quality Specifications", D1N 2093; Apr. 1978, Siemens, Germany; 3 pages.

Primary Examiner—R. Skudy
Attorney, Agent, or Firm—Kenyon & Kenyon

[57] ABSTRACT

In order to assure in a simple manner and with the smallest axial mounting space, a low-noise bearing support having little radial unbalance, two axial ball bearings (2, 3) are provided with a firm fit relative to the rotor shaft (1) and mutually braced axially by an interposed spring washer. Advantageously, ball bearing (3) next to the open end face of the bearing hole is designed as a stationary bearing with a press lift between its inner ring (31) and the rotor shaft (1) as well as between its outer ring (32) and the bearing hole.

10 Claims, 3 Drawing Sheets

BEARING HOUSING, ESPECIALLY FOR A UNILATERALLY AND AXIALLY BRACED EXTERNAL-ROTOR MOTOR

BACKGROUND OF THE INVENTION

The invention relates to a bearing housing for an external rotor motor having two axially spaced ball bearings.

In a known external-rotor motor provided for a memory disk drive, two ball bearings are separately positioned into a bearing hole with an axial spacing between the two inner rings relative to the rotor shaft. The bearings are press fit consecutively on the rotor shaft in such a manner that a sufficiently large distance remains therebetween so that, on the one hand, enough space is provided for two cup springs and an intermediate washer and on the other hand the required bracing between the cup springs in accordance with DIN Standard 2093, is attained.

SUMMARY OF THE INVENTION

It is an object of the present invention, to provide a housing which can be easily assembled to reduce labor costs and in which minimum radial unbalance between the two ball bearings is achieved.

In the bearing housing, according to the invention, at least two ball bearings are arranged axially in tandem wherein the assembly labor and thereby the necessary cost of the motor can be reduced in a manner advantageous particularly for automatic assembly line, by the provision of two ball bearings with a single interposed spring washer. The spring washer comprises circular spring element which is corrugated over its circumference as described for instance in German DIN Standard 0 042 013. Separate adjustment means for each individual ball bearing ring for ensuring the necessary axial space for accommodating two cup springs and an intermediate washer are thereby obviated. At the same time the axial dimensions of the drive can be reduced substantially by the elimination of several separate elements for securing the necessary axial pretension and the direct axial contact of the two ball bearings so that a larger usable space is available, for instance, for the spindle of a memory disk extending around the bearing housing and driven by the rotor shaft.

The assembly, particularly with respect to securing two ball bearings installed simultaneously, can be simplified still further by the provision that, according to one embodiment of the invention, the ball bearing next to the bearing hole on the open housing face is designed as a stationary bearing with a press fit between its inner ring and the rotor shaft as well as between its outer ring and the bearing hole, and only the outer ring resting against the wavy spring washer or the inner ring of the second ball bearing is designed with a sliding fit relative to the bearing hole or the rotor shaft, respectively.

In another embodiment of the invention, only the inner ring of the ball bearing contacts a spring washer.

BRIEF DESCRIPTION OF THE FIGURES

The invention as will be explained in the following with the aid of an exemplary embodiment therefor as illustrated schematically in the drawings wherein shown.

DETAILED DESCRIPTION OF THE INVENTION

Figure 1:
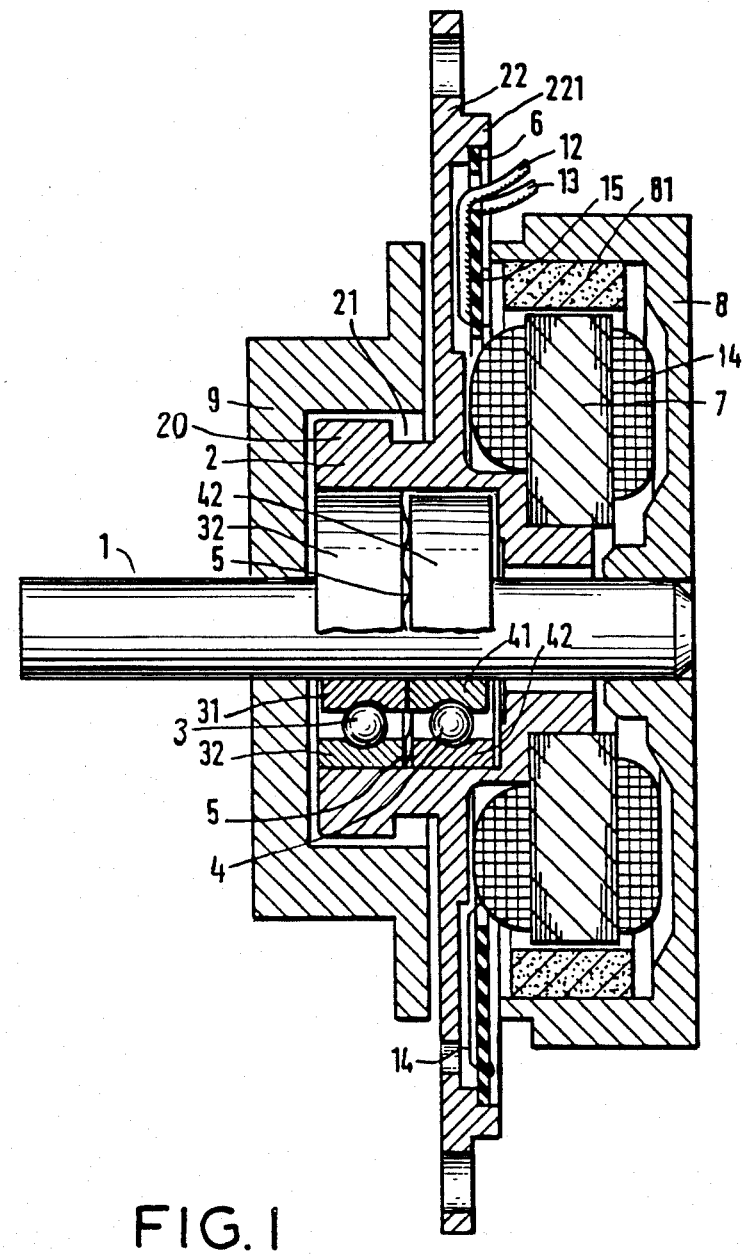
FIG. 1 shows an axial longitudinal section through an external-rotor motor provided for driving the spindle of a memory disk drive.
Figure 3:
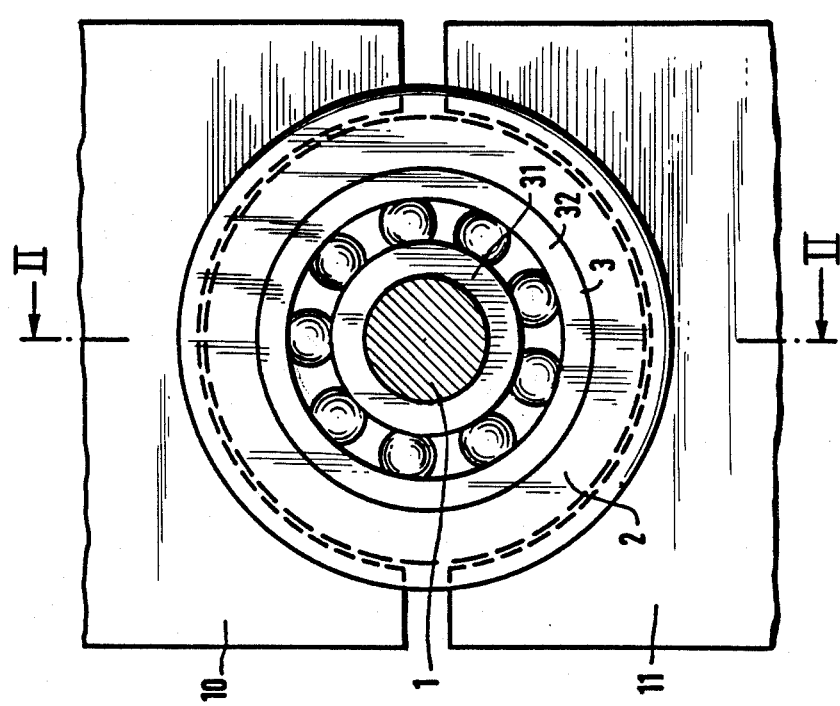
FIG. 3 shows a bracing device which relieves the bearing housing of excessive stress as the ball bearings are inserted.

FIG. 1 shows in an axial longitudinal section an external-rotor motor which drives a spindle 9 of a memory disc and can be installed through a fastening flange 22 formed on the housing to a data processing equipment. The bearing housing 2 serves directly or indirectly as a supporting means for all the motor parts shown in the drawing.

On the right end of the bearing housing 2, there is a wound laminated stack 7 which has been fitted on the housing. On an end face 20 of the bearing housing 2 located axially opposite stack 7, a bearing hole has been machined for holding two ball bearings 3, 4. The bearings are inserted from the left open end face of the bearing hole with a spring washer between the bearings. The ball bearings 3, 4, are provided to support a rotor shaft 1. On the left end of the shaft there is a spindle 9. On the right end of the rotor shaft there is attached a bell shaped cover 8 for the external rotor motor. Magnetic shells 81 are secured to the cover for generating an excitation field for the external-rotor motor.

At the end face of the fastening flange 22 facing the wound stator, there is a circuit board 6 mounted within an axially protruding rim 221. Hall transducers 15 are mounted on the board which are associated, among other things with the operatively rotating permanent-magnet shells 81 and are therefore adjacent to the end face thereof. Supply and signal voltage lines 12 are connected to board 6, and external winding supply lines 13 are connected to the coil windings 14 of the stator lamination stack 7.

Figure 2:
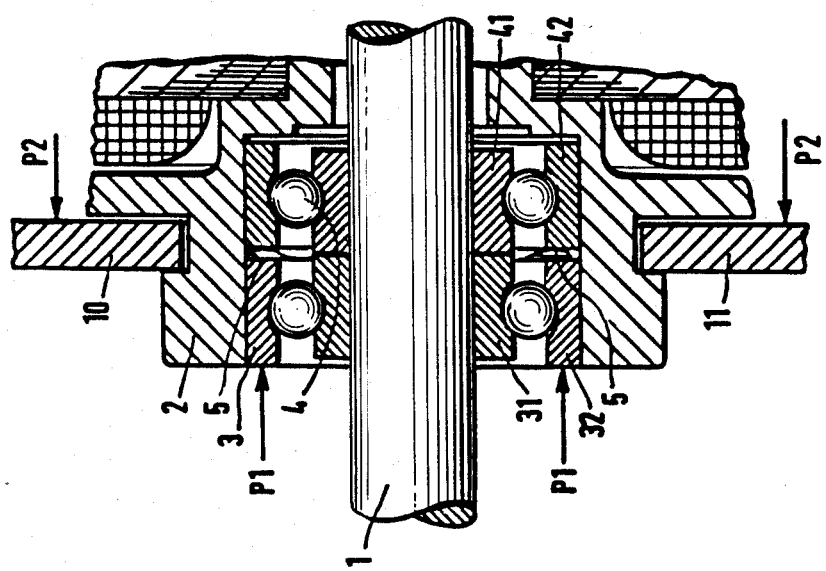
FIG. 2 shows an enlarged detail from FIG. 1 of the two ball bearings disposed within the bearing housing.

The support of the rotor shaft 1, according to the invention, will now be described by making reference to FIG. 2.

The two ball bearings 3, 4 are placed within housing 2 with their inner rings 31, 41, axially contacting each other. The outer rings 32, 42 are axially pretensioned by an interposed spring washer 5 to obtain an even distribution of the axial play between the ball bearings. Advantageously the ball bearing 3 next to the open end face of the bearing hole is designed as a stationary bearing with a press fit between its inner ring 31 and the rotor shaft 1 as well as between its outer ring 32 and an inner surface of the bearing hole. The outer ring 42 of the second bearing, which is resting against the spring washer 5, is designed with a sliding fit relative to the bearing hole. The inner ring of the second ball bearing hole is also press fit to the rotor shaft 1.

By this arrangement, the two ball bearings 3, 4 can be pushed by a small axial length into the bearing hole of the bearing housing 2 in one operation, and, as compared to known arrangements, the need for a further spring element and an interposed washer is obviated. Thus, the play existing in customary ball bearings is eliminated because the inner rings are immediately adjacent axially. The spring washer is not damaged by excessive pressure when the two ball bearings are inserted into the bearing hole. Furthermore, the spring force of the spring washer is sufficient to brace the outer rings axially against each other.

In order to be able, on the one hand, to install on the bearing housing 2 (prior to putting the ball bearings 3, 4 in place), stator stack 7 and to connect the, stator winding to the circuit board mounted on the fastening flange, and, on the other hand, to support the bearing housing without damage, especially in the range of its thin-walled transition from the bearing hole toward the stator reception part, when the two ball bearings 3, 4 are installed on the rotor shaft 1, advantageously, there is provided at the outer circumference of the bearing housing 2 a recess for bracing against the axial pressure with which the ball bearings are pressed into the bearing housing 2. The recess is in the form of a circular slot 21 in the circumferential surface of the bearing flange 2. Into the circular slot 21, two half-washers 10, 11 can be inserted radially which can take up the reaction forces P2 to the pressure forces P1, while the ball bearings 3, 4 are pushed into the bearing hole of the bearing housing 2.

It is evident that in the bracing device constructed according to this invention, the reaction forces, on the one hand, are taken up in a thick-walled part of the bearing housing and thereby, excessive bending stresses are kept away from parts of the bearing housing exposed to deformation and that, on the other hand, the section of the bearing housing located to the right of the bracing device permits the unimpeded assembly of the stator or a circuit board since axial bracing for the ball bearings is unnecessary.

Figure 4:
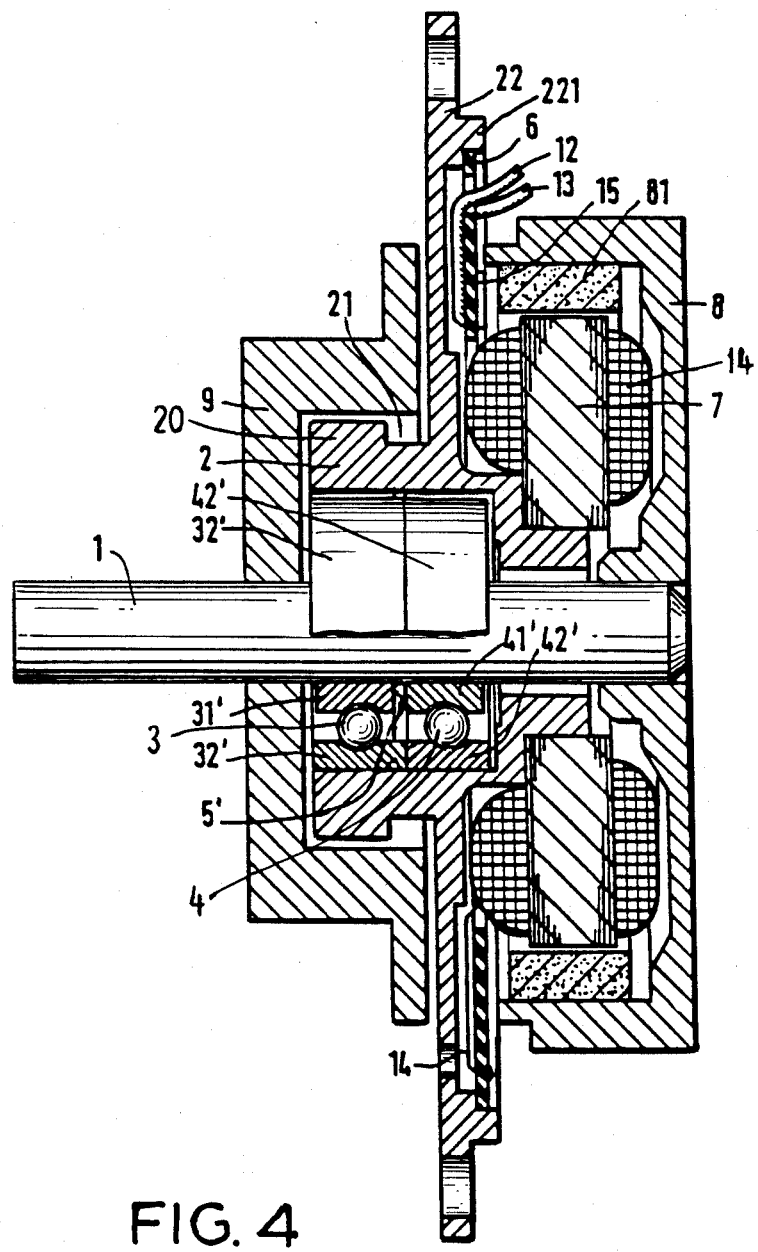
FIG. 4 shows another embodiment of the invention.

In another embodiment of the invention, shown in FIG. 4, housing 2 has two bearings 31' and 41' and an outer ring 32', 42'. In this embodiment, the two outer rings 32' and 42' axially contact each other, while the inner rings 31' and 41' are separated by a spring washer 5' similar to washer 5 in FIG. 1.

What is claimed is:

1. An external rotor motor comprising:
   a bearing housing having an end face and a common bearing opening formed axially inward from said end face;
   first and second ball bearing elements, each received in said common bearing opening, said first and second ball bearing elements being in an axially disposed relation with respect to one another within said common bearing opening;
   each of said first and second ball bearing elements including an inner ring and an outer ring;
   said common bearing opening and said first and second bearing elements being arranged and configured to permit said first ball bearing element and said second ball bearing element to be inserted together into said common bearing opening from said end face;
   a spring washer being disposed only between the outer rings of the axially disposed first and second ball bearing elements for bracing said outer rings axially against each other; and
   a shaft supported by said first and second ball bearing elements;
   wherein said inner rings of the axially disposed first and second ball bearing elements are disposed on said shaft and are in a contacting, side-by-side relation with respect to one another.

2. The motor of claim 1 wherein said first ball bearing (3) is located adjacent to said end face and is a stationary bearing with a press fit between said first bearing inner ring (31) and said shaft (1) and wherein only one of the inner and outer rings of the second ball bearing element is a fit and the other of said inner and outer rings is slidable relative to one of said shaft (1), and said common bearing opening respectively.

3. The motor according to claim 11 wherein at an outer circumference o the bearing housing (2), a recess is provided for the form-locking engagement of a bracing device for stress-relieving said bearing housing.

4. An external rotor motor comprising:
   a bearing housing having an end face and a common bearing opening axially inward from said end face;
   first and second ball bearing elements, each received in said common bearing opening, said first and second ball bearing elements being in an axially disposed relation with respect to one another within said common bearing opening;
   each of said first and second ball bearing elements including an inner ring and an outer ring;
   said common bearing opening and said first and second bearing elements being arranged and configured to permit said first ball bearing element and said second ball bearing element to be inserted together into said common bearing opening from said end face;
   a spring washer being disposed only between the inner rings of the axially disposed first and second ball bearing elements for bracing said inner rings axially against each other; and
   a shaft supported by said first and second ball bearing elements;
   said inner rings of the axially disposed first and second ball bearing elements being disposed on said shaft;
   wherein said outer rings of the axially disposed first and second ball bearing elements are in a contacting side-by-side relation with respect to one another.

5. The motor according to claim 4 further comprising a stator (7) mounted on an end of said bearing housing opposite said end face in the vicinity of another end of said common bearing opening.

6. The motor according to claim 4 wherein said bearing housing is provided with a fastening flange in the vicinity of said another end of the common bearing opening, axially spaced from said stator (7), which fastening flange protrudes radially away from a circumference of said bearing housing.

7. The motor according to claim 5, further comprising of a circuit board (6) mounted at a flange end face of the fastening flange (22) facing the stator (7).

8. The motor according to claim 4 wherein at an outer circumference of the bearing housing (2), a recess is provided for the form-locking engagement of a bracing device for stress-relieving said bearing housing.

9. An external rotor motor comprising:
   a bearing housing with an end face and a bearing hole opening toward said end face;
   first and second ball bearings axially disposed with respect to each other within said bearing hole, each said bearing having an inner ring and an outer ring, said bearing hole and said bearings being arranged and constructed to allow said bearings to be inserted into said bearing hole from said face;
   a spring washer disposed only between said outer rings for bracing said outer rings axially against each other;

a shaft supported by said ball bearings, said inner rings being disposed on said shaft, directly adjacent to each other;
   a stator mounted on ah end of said bearing housing opposite said end face in the vicinity of another end of said bearing hole;
   said bearing housing being provided with a fastening flange in the vicinity of said another end of the bearing hole, axially spaced from said stator, which fastening flange protrudes radially away from a circumference of said bearing housing; and
   a recess provided at an outer circumference of the bearing housing for form-locking engagement of a bracing device for stress-relieving said bearing housing, wherein said recess comprises a circular slot formed on said bearing housing between said end face and the fastening flange.

10. An external rotor motor comprising:
   a bearing housing with an end face and a bearing hole opening toward said end face;
   first and second ball bearings axially disposed with respect to each other within said bearing hole, each said bearing having an inner ring and an outer ring, said bearing hole and said bearings being arranged and constructed to allow said bearings to be inserted into said bearing hole from said face;
   a spring washer disposed only between said inner rings for bracing said inner rings axially against each other;
   a shaft supported by said ball bearings, said outer rings being disposed directly adjacent to each other;
   a stator mounted on an end of said bearing housing opposite said end face in the vicinity of another end of said bearing hole;
   said bearing housing being provided with a fastening flange in the vicinity of said another end of the bearing hole, axially spaced from said stator, which fastening flange protrudes radially away from a circumference of said bearing housing; and
   a recess provided at an outer circumference of the bearing housing for form-locking engagement of a bracing device for stress-relieving said bearing housing, wherein said recess comprises a circular slot formed on said bearing housing between said end face and the fastening flange.

* * * * *